Patented Oct. 5, 1937

2,094,914

UNITED STATES PATENT OFFICE 2,094,914

PROCESS OF PREPARING ALKYLENE SULPHIDES

Karl Dachlauer, Hofheim-in-Taunus, and Lothar Jackel, Frankfort-on-the-Main-Hochst, Germany, assignors to I. G. Farbenindustrie Aktiengesellschaft, Frankfort-on-the-Main, Germany No Drawing. Application September 3, 1936, Serial No. 99,308. In Germany November 10, 1934

5 Claims. (Cl. 260—53)

The present invention relates to a process of preparing alkylenesulphides.

This application is a continuation-in-part of application Serial No. 48,788, filed November 7, 1935, in the name of Karl Dachlauer and Lothar Jackel.

We have found that ethyleneoxide and derivatives thereof, namely aliphatic compounds containing the group

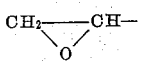

may be caused to react with thiourea and derivatives of thiourea.

Ethyleneoxide and its derivatives, such as propyleneoxide, glycide, epichlorhydrine react with, for instance, thiourea in such a way that sulphur is exchanged for oxygen whereby, on the one hand, the corresponding alkylenesulphides and, on the other hand, urea are formed. It is advantageous to carry out these reactions in the presence of solvents, for instance, water, alcohol, ether or mixtures thereof, or accelerators such as alcali chlorides, alcali carbonates. The compounds obtained are valuable intermediate products, especially for the production of assistants for the textile industry.

The following examples serve to illustrate the invention but they are not intended to limit it thereto, the parts being by weight:

1.—38 parts of thiourea are dissolved in a mixture of 50 parts of ethyleneoxide and 75 parts of water at 10° C.–12° C. and the solution is allowed to stand for some hours at a temperature below 0° C. Thereby, there is formed partly monomolecular and partly polymeric ethylenesulphide, the quantity of the polymer formed increasing pari passu with the rise of the temperature and the duration of the reaction. The thiourea is transformed quantitatively into urea which, after separation of the ethylenesulphides, is obtained by evaporating the solution.

The reaction takes place according to the following scheme:

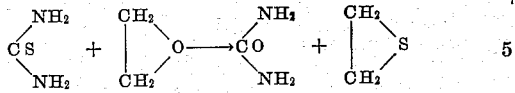

By adding to the reaction mixture 1 part of potassium carbonate the reaction takes place in a shorter time.

By addition of ether to the mixture and thorough stirring until the reaction is complete, there may be obtained from the separated layer of ether, by fractional distillation, the ethylenesulphide.

2.—In a similar way propylenesulphide is obtained from thiourea and propyleneoxide with a good yield.

3.—25 grams of epi-chloro-hydrine are caused to run into a mixture boiling under reflux of 57 grams of diphenyl-thiourea and 50 c. m.$^3$ of benzene. After heating under reflux for several hours the reaction mixture is fractioned under reduced pressure, whereby chloro-propylenesulphide is obtained as a fraction boiling at 70° C. under a pressure of 50 mm. of mercury.

We claim:

1. The process of producing alkylene sulphides which comprises causing an alkylene oxide to react with a thiourea compound.

2. The process of producing alkylene sulphides which comprises causing an alkylene oxide to react with a thiourea compound in the presence of a solvent.

3. The process of producing alkylene sulphide which comprises causing an alkylene oxide to react with a thiourea compound in the presence of water.

4. The process of producing alkylene sulphides which comprises causing an alkylene oxide to react with thiourea.

5. The process of producing ethylene sulphides which comprises causing ethyleneoxide to react with thiourea.

KARL DACHLAUER.
LOTHAR JACKEL.